(12) United States Patent
Chen

(10) Patent No.: US 9,993,057 B2
(45) Date of Patent: Jun. 12, 2018

(54) INTELLIGENT SCHOOLBAG

(71) Applicant: Quanzhou Fantexi Intelligence Technology Co., Ltd., Quanzhou, Fujian (CN)

(72) Inventor: Huicong Chen, Fujian (CN)

(73) Assignee: Quanzhou Fantexi Intelligence Technology Co., Ltd., Quanzhou (CN)

( * ) Notice: Subject to any disclaimer, the term of this patent is extended or adjusted under 35 U.S.C. 154(b) by 0 days. days.

(21) Appl. No.: 15/618,183

(22) Filed: Jun. 9, 2017

(65) Prior Publication Data

US 2017/0273417 A1     Sep. 28, 2017

Related U.S. Application Data

(63) Continuation-in-part of application No. PCT/CN2016/110634, filed on Dec. 19, 2016.

(30) Foreign Application Priority Data

Dec. 24, 2015   (CN) .......................... 2015 1 0988590

(51) Int. Cl.
*A45C 13/02*     (2006.01)
*A45F 3/04*      (2006.01)
(Continued)

(52) U.S. Cl.
CPC ................ *A45C 13/02* (2013.01); *A41D 3/04* (2013.01); *A45C 5/14* (2013.01); *A45C 13/103* (2013.01);
(Continued)

(58) Field of Classification Search
CPC .......... A45C 5/14–5/146; A45C 13/02; A45C 13/025; A45C 13/026; A45C 13/262;
(Continued)

(56) References Cited

U.S. PATENT DOCUMENTS

2007/0034424 A1*  2/2007  Snowden ................. A45C 5/14
                                                    180/65.1
2007/0131462 A1*  6/2007  Hemsley ................. A45C 5/14
                                                    180/19.3
(Continued)

FOREIGN PATENT DOCUMENTS

CN      2165679 Y     5/1994
CN      2601986 Y     2/2004
(Continued)

*Primary Examiner* — Erez Gurari

(57) ABSTRACT

An intelligent schoolbag, comprising a schoolbag body, wherein storage spaces are formed in the schoolbag body, and book selection means are arranged in the storage spaces; wheels and a driving device for driving the wheels to walk are arranged on the schoolbag body, the driving device is connected with pedals for the user to tread on, and the driving device is an electric monowheel of which the walking speed is controlled by an gravity sensing gyroscope. The intelligent schoolbag of the invention can keep books therein in order despite of bumping, thus articles in the schoolbag are neat. The schoolbag realizes easy access to books and can really reduce the burden to carry the schoolbag on the way to schools, and can better meet the needs of students.

10 Claims, 6 Drawing Sheets

(51) Int. Cl.
*A41D 3/04* (2006.01)
*A45C 5/14* (2006.01)
*A45C 13/10* (2006.01)
*A45C 13/26* (2006.01)
*A45F 4/12* (2006.01)

(52) U.S. Cl.
CPC .............. *A45C 13/262* (2013.01); *A45F 3/04* (2013.01); *A45F 4/12* (2013.01); *A41D 2400/422* (2013.01)

(58) Field of Classification Search
CPC ..... A45F 3/04; A45F 4/12; B62B 1/04; B62B 1/10–1/12; B62B 1/14
See application file for complete search history.

(56) References Cited

U.S. PATENT DOCUMENTS

| | | | | |
|---|---|---|---|---|
| 2007/0164064 | A1* | 7/2007 | Nathan | A45C 5/14 |
| | | | | 224/153 |
| 2016/0350639 | A1* | 12/2016 | Tere | A45C 11/00 |
| 2016/0375946 | A1* | 12/2016 | White, Jr. | A45C 15/00 |
| | | | | 362/156 |
| 2017/0055658 | A1* | 3/2017 | Yu | A45C 9/00 |
| 2017/0188679 | A1* | 7/2017 | Jacob | A45C 13/42 |

FOREIGN PATENT DOCUMENTS

| | | |
|---|---|---|
| CN | 201668063 U | 12/2010 |
| CN | 203776332 U | 8/2014 |
| CN | 104824944 A | 8/2015 |

* cited by examiner

INTELLIGENT SCHOOLBAG

CROSS-REFERENCE TO RELATED APPLICATIONS

The present application is a Continuation-in-Part Application of PCT application No. PCT/CN2016/110634 filed on Dec. 19, 2016, which claim the benefit of Chinese patent application No. 201510988590.8 filed on Dec. 24, 2015. All the contents of the above are hereby incorporated by reference.

TECHNICAL FIELD

The invention relates to the technical field of schoolbags, in particular to an intelligent schoolbag.

BACKGROUND

It is well known that the schoolbag is a tool used by students to carry textbooks and stationery supplies. Since ancient times, the schoolbag has the simple function of carrying stationery. Due to the limited quantity of boxes or bags in a traditional schoolbag, the student usually places textbooks of different types and different subjects in one box or bag. However, books inside the schoolbag will lie on all sides due to bumping on the way, it is very inconvenient to find the desired one. Books and other stationery may sometimes mingle with each other, breaking the books, affecting the learning mood, and causing inconvenience.

In addition, the schoolbag is becoming heavier for burdensome schoolwork. In order to reduce the burden on students' shoulders and ensure the normal development of students, patent No. CN201420168358.0 discloses a multifunctional trolley schoolbag comprising a schoolbag body. A support plate is fixed at the bottom side of the schoolbag body, an telescopic rod is arranged at the back side of the schoolbag body, the telescopic rod is fixedly connected with the support plate, rollers are arranged on the bottom of the support plate, a solar panel is arranged on the front of the schoolbag body, a lighting lamp is arranged at the back side of the schoolbag body, an electronic scale is embedded in the bottom of the schoolbag body, and the solar panel is connected with the lighting lamp and the electronic scale through a circuit. But such schoolbag also has the following defects: books inside the schoolbag will lie on all sides due to bumping on the way, it is very inconvenient to find the desired one. In addition, such schoolbag can only reduce the burden of students to some extent, and cannot really reduce the burden to carry the schoolbag on the way to schools. With the development of the science, schoolbags with these functions obviously cannot meet the needs of modern students.

Technical Problems

Books inside the schoolbag will lie on all sides due to bumping on the way, it is very inconvenient to find the desired one. In addition, such schoolbag can only reduce the burden of students to some extent, and cannot really reduce the burden to carry the schoolbag on the way to schools.

Technical Solution

An intelligent schoolbag, comprising a schoolbag body, storage spaces are formed in the schoolbag body, and book selection means are arranged in the storage spaces; wheels and a driving device for driving the wheels to walk are arranged on the schoolbag body, the driving device is connected with pedals for the user to tread on, and the driving device is an electric monowheel of which the walking speed is controlled by a gravity sensing gyroscope.

Preferably, the schoolbag body is provided with a power source and a plurality of bags for accommodating articles, a bag opening is arranged on the upper part of the schoolbag body, a zipper or Velcro for closing the bag opening is arranged on the bag opening of the schoolbag body, and at least three the storage spaces in lateral arrangement are formed in the schoolbag body, with their openings facing the bag opening; a pull rod or handle is arranged on the schoolbag body to control the walking direction of the schoolbag body, and connected with the wheels through a steering mechanism; and the driving device is connected with the power source.

Preferably, the book selection means are arranged on the bottom of the storage spaces, and comprise a first housing, a first mandril, a first compression spring, a picking plate and a button; the first mandril is arranged in the first housing, with one end passing through the first housing, and the end passing through the housing is fixedly connected to the lower end surface of the picking plate; the first mandril is provided with a first stop block for limiting the extension of the first mandril, a first baffle is arranged in the first housing, the first baffle is provided with a first through hole for the other end of the first mandril to pass through, the first compression spring is sleeved on the first mandril between the first stop block and the first baffle, a locking block is arranged at the end where the first mandril passes through the first through hole, the button comprises a latch hook matched to the locking block, a button cap and a second compression spring, the latch hook is arranged in the first housing, one end thereof passing through a side wall of the first housing is fixedly connected with the button cap, the second compression spring is sleeved on the latch hook and arranged between the first housing and the button cap, the picking plate is arranged on the bottom inside the storage spaces, the button cap is arranged on one side of the schoolbag body, the storage spaces are formed on any side wall inside the schoolbag body, or on the bottom inside the schoolbag body.

Preferably, the book selection means are arranged on the bottom of the storage spaces, and comprise a second housing, a second mandrel, a third compression spring and a press plate, the second mandrel is arranged in the second housing, with one end passing through the second housing, the end passing through the second housing is fixedly connected to the lower end surface of the press plate; the second mandril is provided with a second stop block for limiting the extension of the second mandril, a second baffle is arranged in the second housing, the second baffle is provided with a second through hole for the other end of the second mandril to pass through, the third compression spring is sleeved on the second mandril between the second stop block and the second baffle.

Preferably, a notch is formed along the axis of the second mandrel at the end where the second mandril passes through the second through hole, a locking block is arranged on the second mandril at two ends of the notch, a first boss for locking together with the locking block is arranged in the second housing, a second boss for unlocking the locking block is arranged on the housing right below the first boss, the cross section length of the first boss is less than that of the second boss, the cross section of the first boss is trapezoid-shaped, and the locking block is opposite to a bevel edge of the first boss; the second boss is provided with an arc surface, the locking block is opposite to the arc surface of the second boss, the press plate is arranged on the bottom inside the storage spaces, and the storage spaces are formed on any side wall inside the schoolbag body, or on the bottom inside the schoolbag body.

Preferably, the electric monowheel is arranged on the bottom of the schoolbag body; the pedals are movably connected to an axle at one side of the electric monowheel opposite to the schoolbag body, and can be folded on the side where the electric monowheel is arranged; the electric monowheel comprises a controller for controlling the walking speed, a sensor for controlling the balance, and a hub motor arranged in the hub of the wheel to drive the wheel to work, and the controller is respectively connected with the sensor and the hub motor; the controller and the sensor are arranged on the pedals, the sensor is a gyroscope and an accelerometer; or the electric monowheel is connected to the schoolbag body through the pedals, and the pedals are movably connected to the schoolbag body in a retractable manner.

Preferably, the two pedals are arranged on the same side wall of the schoolbag body, and one end of each of the two pedals is removably connected or hinged with the schoolbag body; the two pedals have the same structure and arrangement, and the electric monowheel is connected to the lower sides of the pedals; the electric monowheel comprises a controller for controlling the walking speed, a sensor for controlling the balance, and a hub motor arranged in the hub of the wheel to drive the wheel to work, the controller and the sensor are arranged on the pedals, and the controller is respectively connected with the sensor and the hub motor, the sensor is a gyroscope and an accelerometer.

Preferably, the schoolbag body is provided with a plurality of chambers with their openings facing the outer surface of the schoolbag body, and the openings of the chambers are provided with opening and closing members, raincoat parts are designed in the chambers respectively, and the raincoat parts in the chambers can be spliced into a complete raincoat through splicing parts.

Preferably, a display device is arranged on the outer surface corresponding to the storage spaces of the schoolbag body, an input device is arranged on the outer surface of the schoolbag body, a control device is further arranged on the schoolbag body, and the input device and the display device are connected to the control device; the control device and the display device are connected to the power source.

Preferably, the control device comprises a memory chip, an MUC chip and a GPS positioning tracker, the memory chip and the GPS positioning tracker are connected to the MUC chip, the memory chip is a CF card or TF card, the MUC chip comprises a wireless transmission module and a data processing module, and the wireless transmission module is connected to the data processing module.

Beneficial Effects

With the above-mentioned technical schemes, the invention has the following advantages: first, the intelligent schoolbag of the invention can effectively control the operation of the driving device on the front wheel of the schoolbag through the pedals thereon and the sensor arranged on the pedals, artificially controlling the walking speed of the schoolbag, thus the schoolbag is controllable, interesting, convenient and comfortable.

Second, with the arrangement of a plurality of bags, the intelligent schoolbag of the invention can accommodate more articles, thus better meeting the needs of students. Books are placed in the corresponding storage spaces formed in the schoolbag body; the book to be used can be directly bounced out by the book selection means arranged for the storage spaces, it is unnecessary to search for the book. With easy, more simple and convenient and effortless operation, the intelligent schoolbag is convenient for students to directly take desired books out. The driving device arranged on the schoolbag body helps the user to walk with the schoolbag body, reducing the burden to carry the schoolbag on the way to schools, and the schoolbag is not likely to get lost. Therefore, the intelligent schoolbag of the invention can keep books therein in order despite of bumping, thus articles in the schoolbag are neat. The schoolbag realizes easy access to books and can really reduce the burden to carry the schoolbag on the way to schools.

Third, the intelligent schoolbag of the invention takes an overall shape of an imitated car model, and meets the requirements for personality and fashion of modern students due to the novel structure and more unique appearance.

Fourth, the walking speed of the schoolbag can be effectively monitored by the driving device arranged on the intelligent schoolbag as well as the controller, the gyroscope and the accelerator of the driving device, which can effectively prevent the schoolbag from tipping over while turning on the one hand, automatically reducing the speed. The intelligent schoolbag can also automatically slow down to avoid danger to operators due to too fast speed on the other hand, achieving 2-level monitoring and a high degree of automation, making it safer, more convenient and comfortable to carry the schoolbag.

Fifth, the intelligent schoolbag of the invention is equipped with a bicycle which can be folded on the schoolbag body, thus it is convenient for carrying a bicycle, and convenient to meet the needs of people to go out for exercise or travel.

Sixth, a raincoat is arranged on the intelligent schoolbag of the invention, and the raincoat on the schoolbag can be directly unfolded and put on to prevent the user from being exposed to the rain when it rains. When not in use, each part of the raincoat can be folded in corresponding chamber in the schoolbag. In addition, the raincoat can be divided into a plurality of separate parts which can be detachably connected with the schoolbag, and can be put on to prevent the user from being exposed to the rain. When not in use, the raincoat can be directly removed and stored in the chambers of the schoolbag.

DETAILED DESCRIPTION OF THE PREFERRED EMBODIMENTS

Figure 1:
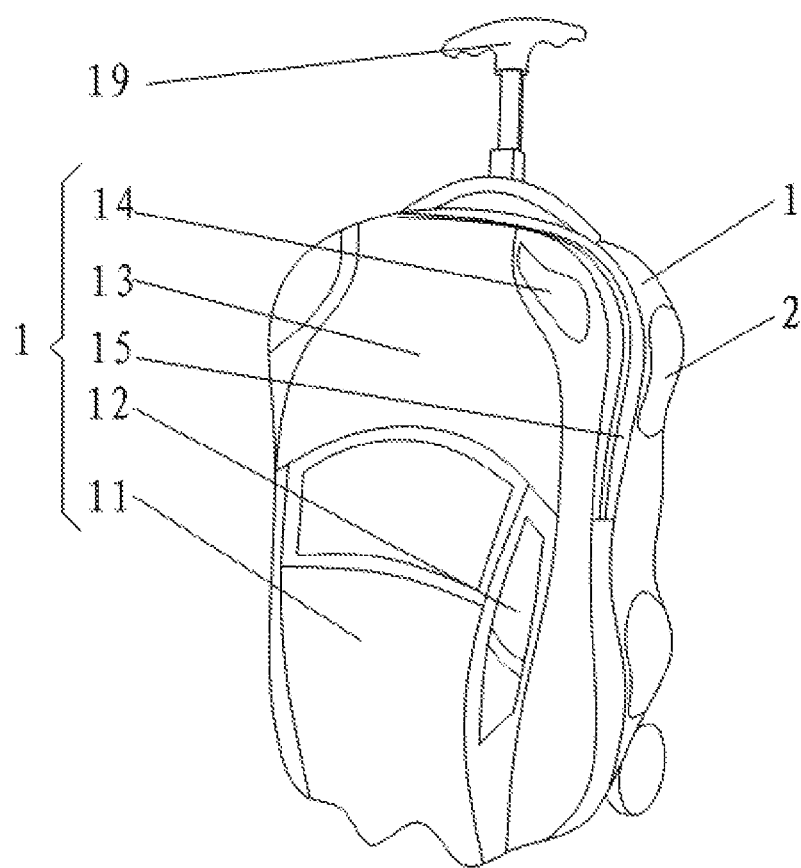
FIG. 1 is a structural diagram of the intelligent schoolbag of the invention.
Figure 2:
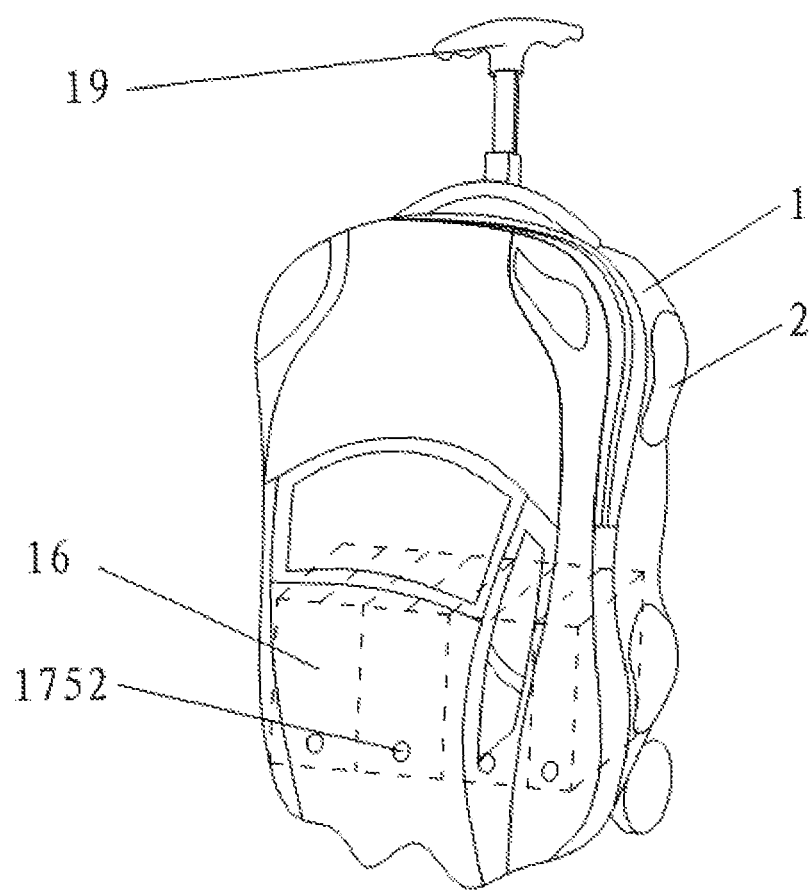
FIG. 2 is a local perspective structural diagram of the intelligent schoolbag of the invention.

As shown in FIG. 1 and FIG. 2, an intelligent schoolbag of the invention comprises a schoolbag body 1, and the schoolbag body 1 is provided with a plurality of bags 2 for accommodating articles. A bag opening 15 of the schoolbag body 1 is arranged on the upper part of the schoolbag body 1, a zipper or Velcro (not shown) for closing the bag opening 15 is arranged on the bag opening 15 of the schoolbag body 1, and at least three storage spaces 16 in lateral arrangement are formed in the schoolbag body 1, with their openings facing the bag opening 15; textbooks or stationery can be placed in the storage spaces 16, and book selection means 17 are arranged in the storage spaces 16. Wheels and a driving device for driving the wheels to walk are arranged on the schoolbag body, a pull rod or handle 19 is arranged on the schoolbag body 1 to control the walking direction of the schoolbag body 1, and connected with the wheels through a steering mechanism (not shown); and the driving device is connected with a power source. With the arrangement of a plurality of bags 2, the intelligent schoolbag of the invention can accommodate more articles, thus better meeting the needs of students. Books are placed in the corresponding storage spaces 16 formed in the schoolbag body 1; the book to be used can be directly bounced out by the book selection means 17 arranged in the storage spaces 16, it is unnecessary to search for the book. With easy, more simple and convenient and effortless operation, the intelligent schoolbag is convenient for students to directly take desired books out. The driving device arranged on the schoolbag body 1 helps the user to walk with the schoolbag body 1, reducing the burden to carry the schoolbag on the way to schools, and the schoolbag is not likely to get lost. Therefore, the intelligent schoolbag of the invention can keep books therein in order despite of bumping, thus articles in the schoolbag are neat. The schoolbag realizes easy access to books and can really reduce the burden to carry the schoolbag on the way to schools.

As shown in FIG. 1, preferably, the schoolbag body 1 takes an overall shape of an imitated car model. The schoolbag body 1 comprises an imitated car roof 11, an imitated compartment (not shown), imitated car doors 12, an imitated engine hood 13 and imitated car lamps 14, the imitated car doors 12 are side bags on the schoolbag body 1, the imitated engine hood 13 is a first small bag (not shown) arranged on the front part of the schoolbag body 1, and the imitated car lamps 14 are second small bags (not shown) arranged on the front of the schoolbag body 1. The intelligent schoolbag of the invention takes an overall shape of an imitated car model, and meets the requirements for personality and fashion of modern students due to the novel structure and more unique appearance.

Figure 3:
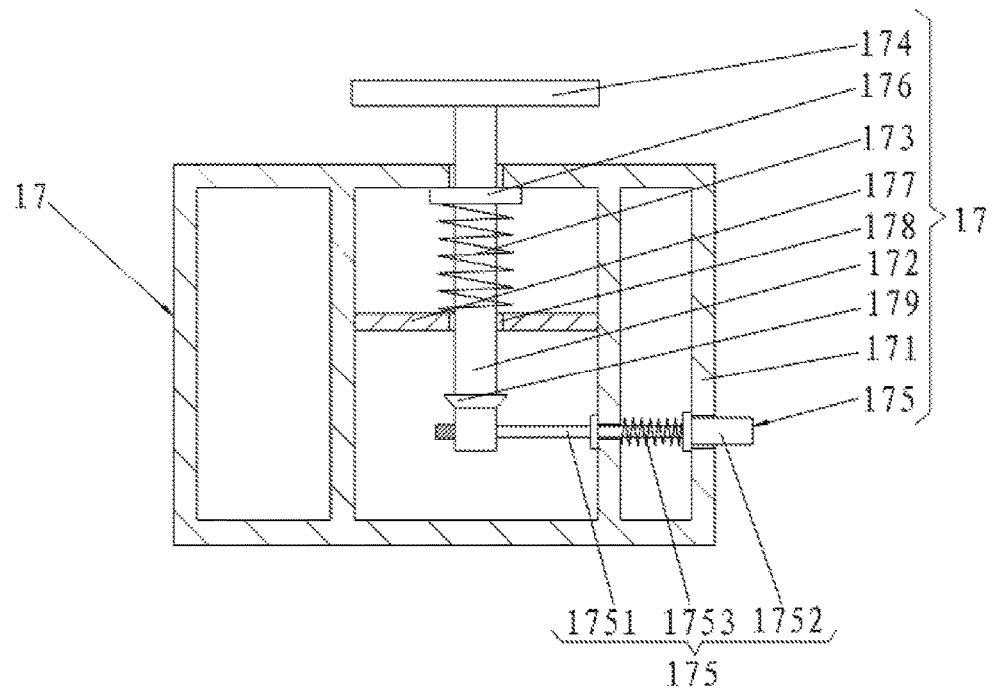
FIG. 3 is a sectional view of the book selection means of the intelligent schoolbag of the invention.

As shown in FIG. 3, preferably, the book selection means 17 are arranged on the bottom of the storage spaces 16, and comprise a first housing 171, a first mandril 172, a first compression spring 173, a picking plate 174 and a button 175; the first mandril 172 is arranged in the first housing 171, with one end passing through the first housing 171, and the end passing through the housing 171 is fixedly connected to the lower end surface of the picking plate 174; the first mandril 172 is provided with a first stop block 176 for limiting the extension of the first mandril 172, a first baffle 177 is arranged in the first housing 171, the first baffle 177 is provided with a first through hole 178 for the other end of the first mandril 172 to pass through, the first compression spring 173 is sleeved on the first mandril 172 between the first stop block 176 and the first baffle 177, a locking block 179 is arranged at the end where the first mandril 172 passes through the first through hole 178, the button 175 comprises a latch hook 1751 matched to the locking block 179, a button cap 1752 and a second compression spring 1753, the latch hook 1751 is arranged in the first housing 171, one end thereof passing through a side wall of the first housing 171 is fixedly connected with the button cap 1752, the second compression spring 1753 is sleeved on the latch hook 1751 and arranged between the first housing 171 and the button cap 1752, the picking plate 174 is arranged on the bottom inside the storage spaces 16, the button cap 1752 is arranged on one side of the schoolbag body 1, the storage spaces 16 are formed on any side wall inside the schoolbag body 1, or on the bottom inside the schoolbag body 1. As the book selection means 17 and the storage spaces 16 are in one-to-one correspondence, and the corresponding book selection means 17 are arranged on the bottom of the corresponding storage spaces 16. Books artificially organized are placed in different storage spaces 16. To take out a book, the bag opening 15 on the schoolbag body 1 is unzipped, then the button cap 1752 of the button 175 of each of the book selection means 17 in the corresponding storage spaces 16 is pressed, the locking block 179 detaches from the locking hook 1751, and the picking plate 174 on the book selection means 17 moves up under the action of elastic force, i.e., the corresponding book selection means 17 in the storage spaces 16 bounces or pushes the book out by the picking plate 174, thus it is unnecessary to look through the schoolbag for the book. With easy, more simple and convenient and effortless operation, the intelligent schoolbag is convenient for students to directly take desired books out. To place a book, the book pushes the picking plate 174 on the book selection means 17 in contact with the book to move down by directly pressing the side edge of the book facing the opening, then the locking block 179 is attached to the locking hook 1751. Similarly, a pencil case can also be placed in the storage spaces 16.

Figure 4:
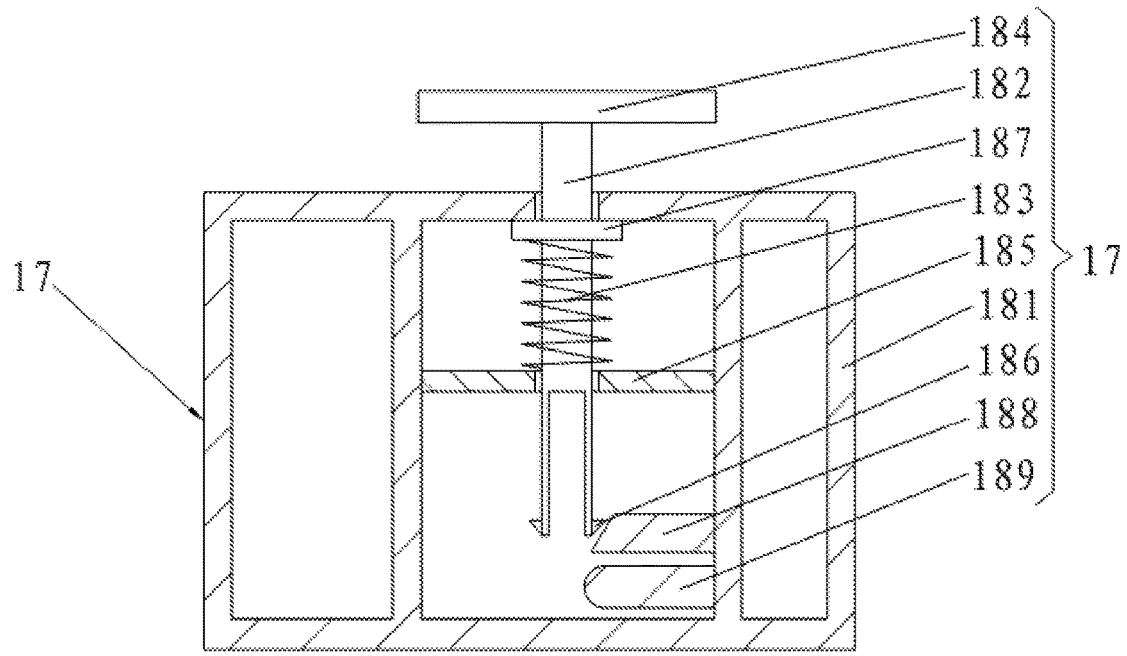
FIG. 4 is another structural diagram of the book selection means of the intelligent schoolbag of the invention.

As shown in FIG. 4, preferably, the book selection means 17 are arranged on the bottom of the storage spaces, and comprise a second housing 181, a second mandril 182, a second compression spring 183 and a press plate 184, the second mandril 182 is arranged in the second housing 181, with one end passing through the second housing 181, and the end passing through the second housing 181 is fixedly connected to the lower end surface of the press plate 184; the second mandril 182 is provided with a second stop block 187 for limiting the extension of the second mandril 182, a second baffle 185 is arranged in the second housing 181, the second baffle 185 is provided with a second through hole (not shown) for the other end of the second mandril 182 to pass through, the third compression spring 183 is sleeved on the second mandril 182 between the second stop block 187 and the second baffle 185, a notch (not shown) is formed along the axis of the second mandrel 182 at the end where the second mandril 182 passes through the second through hole, a locking block 186 is arranged on the second mandril 182 at two ends of the notch, a first boss 188 for locking together with the locking block 186 is arranged in the second housing 181, a second boss 189 for unlocking the locking block 186 is arranged on the housing right below the first boss 188, the cross section length of the first boss 188 is less than that of the second boss 189, the cross section of the first boss 188 is trapezoid-shaped, and the locking block 186 is opposite to a bevel edge of the first boss 188; the second boss 189 is provided with an arc surface, the locking block 186 is opposite to the arc surface of the second boss 189, the press plate 184 is arranged on the bottom inside the storage spaces 16, and the storage spaces 16 are formed on any side wall inside the schoolbag body 1, or on the bottom inside the schoolbag body 1. The elastic force of the third compression spring 183 is much larger than the resilience of the second mandril 182.

The intelligent schoolbag of the invention is provided with book selection means 17. To store books, the cover body and the schoolbag body are unzipped to place the books artificially organized in different storage spaces 16, and the press plate 184 in contact with the books is pushed down by pressing the side edges of the books facing the opening in the corresponding storage spaces 16. The locking block 186 on the second mandril 182 is attached to the first boss 188, that is, the first boss 188 hooks up the locking block 186 on the second mandril 182 to realize the storage of books.

To take out a book, the bag opening 15 on the schoolbag body 1 is unzipped, then the press plate 184 in contact with the book is further pushed down by pressing the side edge of the book facing the opening in the corresponding storage spaces 16. The locking block 186 on the second mandril 182 detaches from the first boss 188, and touches the arc surface of the second boss 189 to press the locking block 186 on the second mandril 182 to move inward. Then under the action of elastic force, the second mandril 182 moves up, and the press plate 184 moves up to bounce or push books out, thus it is unnecessary to look through the schoolbag for the books. With simple operation and convenient use, students can take desired books out. Similarly, a pencil case can also be placed in the storage spaces 16.

Figure 5:
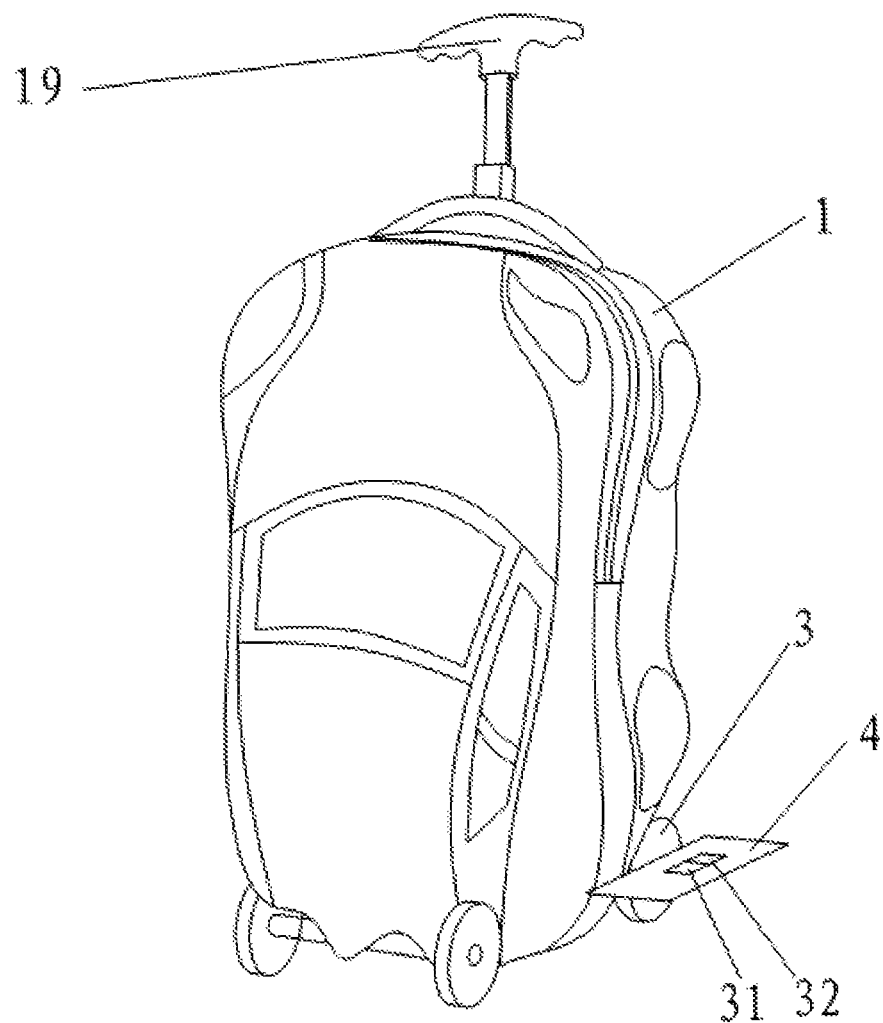
FIG. 5 is a structural diagram of the pedals arranged on the intelligent schoolbag of the invention.
Figure 6:
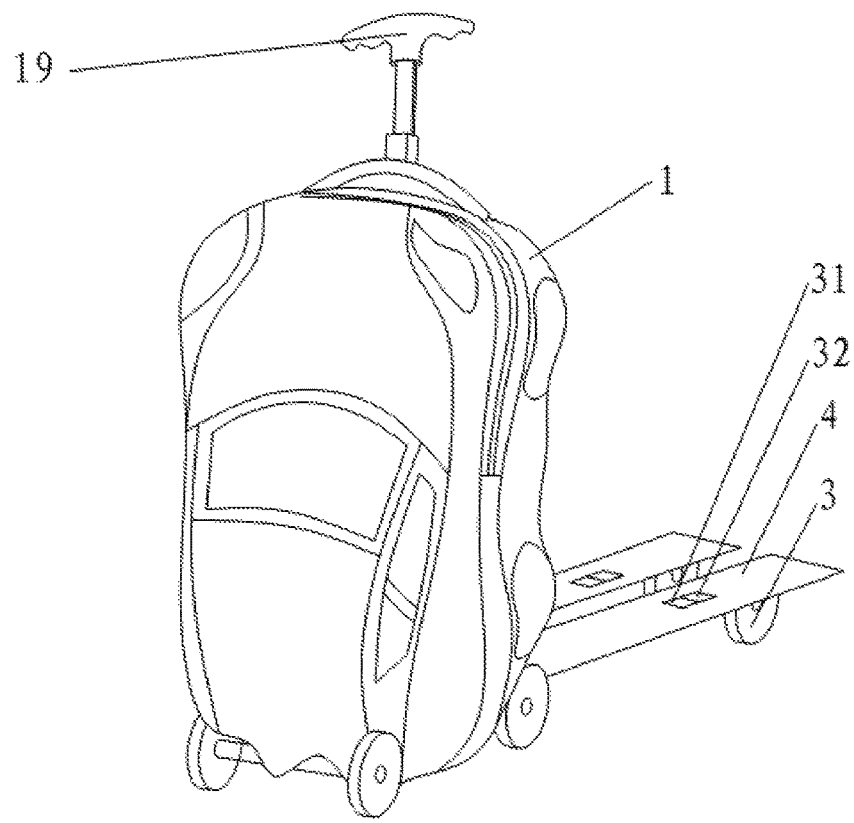
FIG. 6 is another structural diagram of the pedals arranged on the intelligent schoolbag of the invention.

As shown in FIG. 5 and FIG. 6, preferably, wheels (not shown) and a driving device for driving the wheels to walk are arranged on the schoolbag body 1, and the driving device is connected with pedals 4 for the user to tread on; the driving device is an electric monowheel 3 of which the walking speed is controlled by a gravity sensing gyroscope; the electric monowheel 3 is arranged on the bottom of the schoolbag body 1; the pedals 4 are movably connected to an axle not shown at one side of the electric monowheel 3 opposite to the schoolbag body 1, and can be folded on the side where the electric monowheel 3 is arranged; the electric monowheel 3 comprises a controller 31 for controlling the walking speed, a sensor 32 for controlling the balance, and a hub motor not shown arranged in the hub of the wheel to drive the wheel to work, and the controller 31 is respectively connected with the sensor 32 and the hub motor; the controller 31 and the sensor 32 are arranged on the pedals 4, and the sensor 32 is a gyroscope and an accelerometer or a gravity sensor; or the electric monowheel 3 is connected to the schoolbag body 1 through the pedals 4, and the pedals 4 are movably connected to the schoolbag body 1 in a retractable manner; the two pedals 4 are arranged on the same side wall of the schoolbag body 1, and one end of each of the two pedals 4 is removably connected or hinged with the schoolbag body 1; the two pedals 4 have the same structure and arrangement, a driving device is connected to the lower sides of the pedals 4, and the driving device is an electric monowheel 3; the electric monowheel 3 comprises a controller 31 for controlling the walking speed, a sensor 32 for controlling the balance, and a hub motor arranged in the hub of the wheel to drive the wheel to work, the controller 31 and the sensor 32 are arranged on the pedals 4, and the controller 31 is respectively connected with the sensor 32 and the hub motor, the sensor 32 is a gyroscope and an accelerometer or a gravity sensor. The intelligent schoolbag of the invention can effectively control the operation of the driving device on the front wheel of the schoolbag through the pedals 4 thereon and the sensor 32 arranged on the pedals 4, artificially controlling the walking speed of the schoolbag, thus the schoolbag is controllable, interesting, convenient and comfortable. The driving device arranged on the schoolbag body helps the user to walk with the schoolbag body, reducing the burden to carry the schoolbag on the way to schools, and the schoolbag is not likely to get lost. In addition, the walking speed of the schoolbag can be effectively monitored by the controller 31, the gyroscope and the accelerator of the driving device, which can effectively prevent the schoolbag from tipping over while turning on the one hand, automatically reducing the speed. The intelligent schoolbag can also automatically slow down to avoid danger to operators due to too fast speed on the other hand, achieving 2-level monitoring and a high degree of automation, making it safer, more convenient and comfortable to carry the schoolbag.

The driving device can be a driving device commonly used in existing unicycles, unicycle electromobiles, single wheel electromobiles, electric unicycles and self-balanced electric unicycles. For example, the driving device has a built-in control box for adjusting the walking state of the schoolbag, which consists of a gyroscope sensor, a gravity sensing gyroscope, a balance control circuit board or a control system central processor (for storing high speed threshold and low speed threshold), a microcontroller, a power saver, a contact switch, a movable balance block, and a flywheel set, a brake pad and related accessories.

The sensor 32 in the invention can work based on any of the following two operating principles: one is to transform the pressure applied by a foot sensed by a gravity sensor into an electric signal and transmit the electric signal to the controller 31. The other is that the gyroscope itself has a brake adjustment function which keeps it always in an equilibrium state. The gyroscope will automatically generate an electric signal when it senses that the human body or schoolbag body 1 is tilted, and transmit the signal to the controller 31 for analysis and processing, and the controller 31 sends the signal to control the hub motor to do acceleration and deceleration work or stop.

The electric monowheel 3 is connected to the schoolbag body 1 through the pedals 4, and the pedals 4 are movably connected to the schoolbag body 1 in a retractable manner. When the user treads on the pedals 4, the driving device can change with the center of gravity of the user according to the principles of human body mechanics. The schoolbag body 1 travels forward when the user moves the center of gravity of the foot forward, and slows down and brakes when the user moves the center of gravity of the foot backward. The driving device is controlled to walk fast, walk slowly, stop, or keep in anterior-posterior balance by changing the center of gravity of the foot of the user.

It should be specially noted that the schoolbag body 1 is provided with two wheels, i.e., a front wheel and a rear wheel. The electric monowheel 3 is arranged on any side wall of the schoolbag body 1, side by side with the rear wheel, thus three wheels are arranged on the bottom of the schoolbag body 1. Of course, the schoolbag body 1 can also be equipped with a front wheel, and two electric monowheels 3 arranged on any side wall of the schoolbag body 1. Or the electric monowheel 3 is connected to the schoolbag body 1 through the pedals 4, and the pedals 4 are movably connected to the schoolbag body 1 in a retractable manner.

When necessary, the pedals 4 are put down, and the user then stands on the pedals 4 of the electric monowheel 3 to control the schoolbag body 1 to walk fast, walk slowly, stop, or keep in anterior-posterior balance.

The intelligent schoolbag of the invention can walk automatically or can be ridden to reduce the fatigue of students on the way to schools. As the pedals 4 for the user to tread on are movably connected to both sides of the schoolbag body 1, and sensors 32 are arranged on the pedals 4, i.e., gravity sensors or gyroscopes and accelerators, even an adult can stand on the pedals 4 and control the hub motor to work by treading on the sensors 32, so the schoolbag can walk automatically or carry students to walk, allowing the schoolbag to be more interesting.

Figure 7:
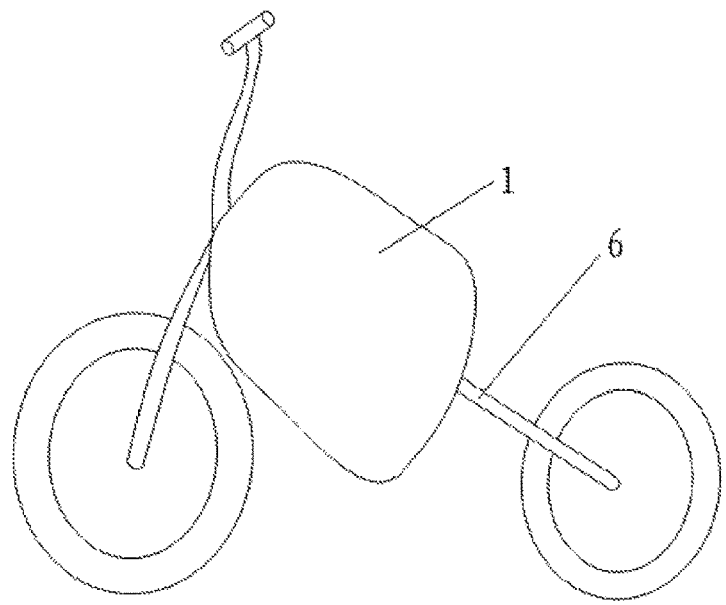
FIG. 7 is a structural diagram of the intelligent schoolbag arranged on a bicycle of the invention.

As shown in FIG. 7, preferably, the schoolbag body 1 is arranged on a bicycle 6 which is a foldable bicycle or foldable mountain bike. The intelligent schoolbag of the invention is equipped with a bicycle which can be folded on the schoolbag body 1, thus it is convenient for carrying a bicycle, and convenient to meet the needs of people to go out for exercise or travel.

Figure 8:
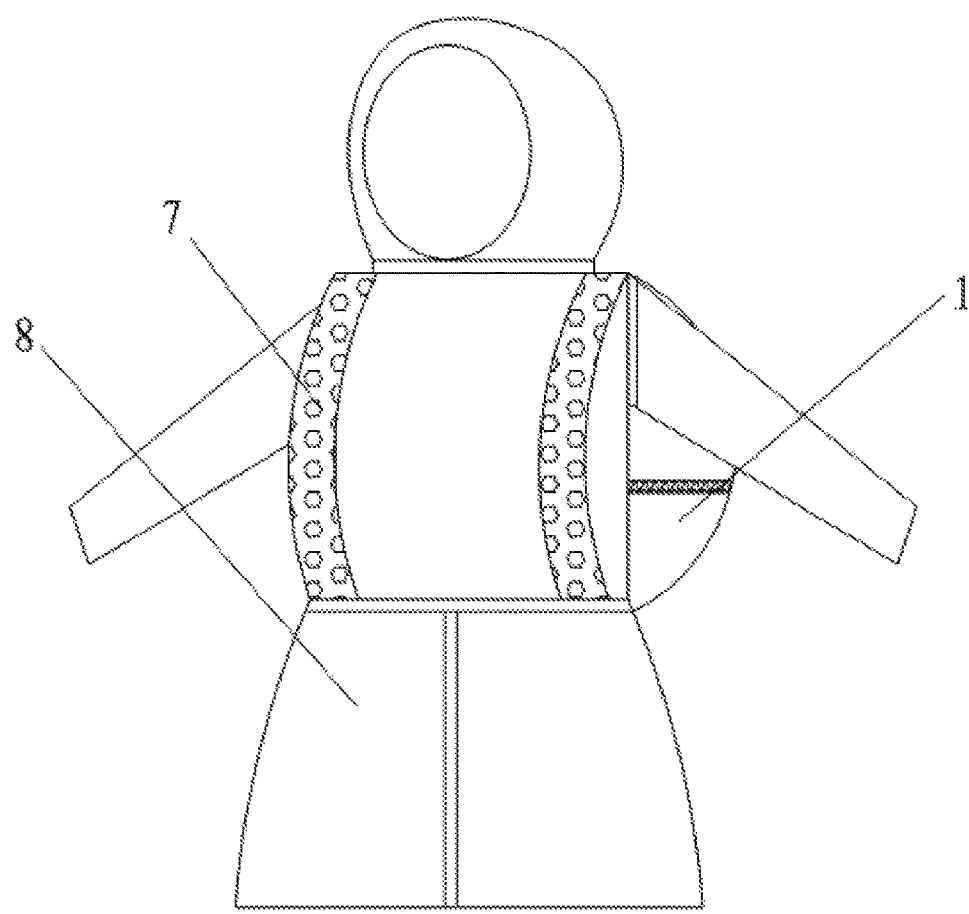
FIG. 8 is a structural diagram of the intelligent schoolbag with the raincoat unfolded of the invention.

As shown in FIG. 8, preferably, the schoolbag body 1 is provided with a plurality of chambers not shown with their openings facing the outer surface of the schoolbag body 1, and the openings of the chambers are provided with opening and closing members not shown, raincoat parts 8 are designed in the chambers respectively, and the raincoat parts 8 in the chambers can be spliced into a complete raincoat through splicing parts.

As shown in FIG. 8, preferably, the chambers are connected with the raincoat parts by means of a zipper or Velcro. The raincoat parts 8 are arranged on the intelligent schoolbag of the invention, and the raincoat parts 8 on the schoolbag can be directly unfolded and put on to prevent the user from being exposed to the rain when it rains. When not in use, each of the raincoat parts 8 can be folded in corresponding chamber in the schoolbag. In addition, the raincoat parts 8 can be divided into a plurality of separate parts which can be detachably connected with the schoolbag, and can be put on to prevent the user from being exposed to the rain. When not in use, the raincoat parts 8 can be directly removed and stored in the chambers of the schoolbag.

It should be specially noted that the raincoat parts are partially connected to the edges of the chambers by means of either direct stitching or a zipper or Velcro; the remaining part is used for connecting raincoat parts after the user puts on the raincoat, and similarly, the connecting portions of raincoat parts are connected by means of a zipper or Velcro.

For the intelligent schoolbag of the invention, the schoolbag body 1 is also equipped with a control device (not shown), a sensor (not shown) for sensing a human body, and a body characteristics recognizer (not shown) for recognizing body characteristics, and the sensor and the body characteristics recognizer are connected with the control device. The body characteristics recognizer and the sensor are equipped with conventional settings, for example, the body characteristics recognizer is a micro camera, and the sensor can be a sensor chip or a fingerprint reader. The owner of the schoolbag can be identified by the sensor and the body characteristics recognizer arranged on the schoolbag body 1, reflecting the intelligence. The sensor chip can be a pulse measurement chip or a heartbeat measurement chip; the fingerprint reader can be a capacitive sensor chip or a resistive sensor chip.

For the intelligent schoolbag of the invention, a display device not shown is arranged on the outer surface corresponding to the storage spaces 16 of the schoolbag body 1, an input device not shown is arranged on the outer surface of the schoolbag body 1, a control device not shown is further arranged on the schoolbag body 1, and the input device and the display device are connected to the control device; the control device and the display device are connected to the power source.

For the intelligent schoolbag of the invention, the control device comprises a memory chip (not shown), an MUC chip (not shown) and a GPS positioning tracker (not shown), the memory chip and the GPS positioning tracker are connected to the MUC chip, the memory chip is a CF card or TF card, the MUC chip comprises a wireless transmission module and a data processing module, and the wireless transmission module is connected to the data processing module. Data collected by the GPS positioning tracker is processed by the MUC chip and then transmitted by the wireless transmission module on the MUC chip. The wireless transmission module is a wireless transmitter or a WIFI transmitter. The MUC chip is used for data transmission and processing, and has a wireless transmission function. A wireless transmission system and equipment connected to a mobile phone SIM card through the MUC chip can promptly send the data to the mobile phone of the user to remind the user.

For the intelligent schoolbag of the invention, preferably, a reflective sign (not shown) is arranged on the schoolbag body 1.

For the intelligent schoolbag of the invention, preferably, a first charging socket (not shown) for charging a battery is arranged on the schoolbag body 1, and the charging socket is connected with the battery. A second charging socket (not shown) for charging electronic equipment is further arranged on the schoolbag body 1, and the second charging socket can be a USB socket.

For the intelligent schoolbag of the invention, a memory chip (not shown) for memorizing books selected by the book selection means 17 is arranged on the schoolbag body 1, an input end of the memory chip is connected with the button on the book selection means 17, the memory chip is connected with the control device, and the memory chip and the control device are connected to the power source.

It should be specially noted that, for the intelligent schoolbag of the invention, the pedals 4 can be directly folded on the schoolbag body 1 when the driving device is not used to drive the schoolbag, thus the intelligent schoolbag is convenient to use and does not occupy other space. The schoolbag can be pushed or pulled by the user, and is also conducive to taking exercise, meeting the current needs of people.

The hub motor in the invention can be a DC motor or a stepping motor.

With the book selection means 17, the foldable bicycle, the driving device and the raincoat parts 8, the intelligent schoolbag of the invention is novel in structure, which is beneficial to reducing the fatigue to carry the schoolbag and allowing the schoolbag to be more interesting.

The invention claimed is:

1. An intelligent schoolbag, comprising a schoolbag body, wherein, storage spaces are formed in the schoolbag body, and book selection means are arranged in the storage spaces; wheels and a driving device for driving the wheels are arranged on the schoolbag body, the driving device is connected with pedals for the user to tread on, and the driving device is an electric monowheel of which the walking speed is controlled by a gravity sensing gyroscope.

2. The intelligent schoolbag according to claim 1, wherein, the schoolbag body is provided with a power source and a plurality of bags for accommodating articles, a bag opening is arranged on the upper part of the schoolbag body, a zipper or Velcro for closing the bag opening is arranged on the bag opening of the schoolbag body, and at least three storage spaces in lateral arrangement are formed in the schoolbag body, with their openings facing the bag opening; a pull rod or handle is arranged on the schoolbag body to control the walking direction of the schoolbag body, and connected with the wheels through a steering mechanism; and the driving device is connected with the power source.

3. The intelligent schoolbag according to claim 1, wherein, the book selection means are arranged on the bottom of the storage spaces, and comprise a first housing, a first mandril, a first compression spring, a picking plate and a button; the first mandril is arranged in the first housing, with one end passing through the first housing, and the end passing through the housing is fixedly connected to the lower end surface of the picking plate; the first mandril is provided with a first stop block for limiting the extension of the first mandril, a first baffle is arranged in the first housing, the first baffle is provided with a first through hole for the other end of the first mandril to pass through, the first compression spring is sleeved on the first mandril between the first stop block and the first baffle, a locking block is arranged at the end where the first mandril passes through the first through hole, the button comprises a latch hook matched to the locking block, a button cap and a second compression spring, the latch hook is arranged in the first housing, one end thereof passing through a side wall of the first housing is fixedly connected with the button cap, the second compression spring is sleeved on the latch hook and arranged between the first housing and the button cap, the picking plate is arranged on the bottom inside the storage spaces, the button cap is arranged on one side of the schoolbag body, the storage spaces are formed on any side wall inside the schoolbag body, or on the bottom inside the schoolbag body.

4. The intelligent schoolbag according to claim 1, wherein, the book selection means are arranged on the bottom of the storage spaces, and comprise a second housing, a second mandril, a third compression spring and a press plate, the second mandrel is arranged in the second housing, with one end passing through the second housing, the end passing through the second housing is fixedly connected to the lower end surface of the press plate; the second mandril is provided with a second stop block for limiting the extension of the second mandril, a second baffle is arranged in the second housing, the second baffle is provided with a second through hole for the other end of the second mandril to pass through, the third compression spring is sleeved on the second mandril between the second stop block and the second baffle.

5. The intelligent schoolbag according to claim 4, wherein, a notch is formed along the axis of the second mandrel at the end where the second mandril passes through the second through hole, a locking block is arranged on the second mandril at two ends of the notch, a first boss for locking together with the locking block is arranged in the second housing, a second boss for unlocking the locking block is arranged on the housing right below the first boss, the cross section length of the first boss is less than that of the second boss, the cross section of the first boss is trapezoid-shaped, and the locking block is opposite to a bevel edge of the first boss; the second boss is provided with an arc surface, the locking block is opposite to the arc surface of the second boss, the press plate is arranged on the bottom inside the storage spaces, and the storage spaces are formed on any side wall inside the schoolbag body, or on the bottom inside the schoolbag body.

6. The intelligent schoolbag according to claim 1, wherein, the electric monowheel is arranged on the bottom of the schoolbag body; the pedals are movably connected to an axle at one side of the electric monowheel opposite to the schoolbag body, and can be folded on the side where the electric monowheel is arranged; the electric monowheel comprises a controller for controlling the walking speed, a sensor for controlling the balance, and a hub motor arranged in the hub of the wheel to drive the wheel to work, and the controller is respectively connected with the sensor and the hub motor; the controller and the sensor are arranged on the pedals, the sensor is a gyroscope and an accelerometer; or the electric monowheel is connected to the schoolbag body through the pedals, and the pedals are movably connected to the schoolbag body in a retractable manner.

7. The intelligent schoolbag according to claim 1, wherein, the pedals have two and are arranged on the same side wall of the schoolbag body, and one end of each of the two pedals is removably connected or hinged with the schoolbag body; the two pedals have the same structure and arrangement, and the electric monowheel is connected to the lower sides of the pedals; the electric monowheel comprises a controller for controlling the walking speed, a sensor for controlling the balance, and a hub motor arranged in the hub of the wheel to drive the wheel to work, the controller and the sensor are arranged on the pedals, and the controller is respectively connected with the sensor and the hub motor, the sensor is a gyroscope and an accelerometer.

8. The intelligent schoolbag according to claim 1, wherein, the schoolbag body is provided with a plurality of chambers with their openings facing the outer surface of the schoolbag body, and the openings of the chambers are provided with opening and closing members, raincoat parts are designed in the chambers respectively, and the raincoat parts in the chambers can be spliced into a complete raincoat through splicing parts.

9. The intelligent schoolbag according to claim 1, wherein, a display device is arranged on the outer surface corresponding to the storage spaces of the schoolbag body, an input device is arranged on the outer surface of the schoolbag body, a control device is further arranged on the schoolbag body, and the input device and the display device are connected to the control device; the control device and the display device are connected to the power source.

10. The intelligent schoolbag according to claim 9, wherein, the control device comprises a memory chip, an MUC chip and a GPS positioning tracker, the memory chip and the GPS positioning tracker are connected to the MUC chip, the memory chip is a CF card or TF card, the MUC chip comprises a wireless transmission module and a data processing module, and the wireless transmission module is connected to the data processing module.

* * * * *